United States Patent
Na et al.

(10) Patent No.: US 6,576,589 B1
(45) Date of Patent: Jun. 10, 2003

(54) METHOD FOR MAKING ANATASE TYPE TITANIUM DIOXIDE PHOTOCATALYST

(75) Inventors: Hai Sub Na, Seoul (KR); Woo Suk Choi, Seoul (KR); Chul Han Kwon, Kyonggi-do (KR); Sung Hwa Lee, Kyongsangnam-do (KR); Young Ki Hong, Kyongsangnam-do (KR); Kyeong Wook Heo, Kyongsangnam-do (KR); Jin Ho Choy, Seoul (KR); Yang Su Han, Seoul (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 09/664,771

(22) Filed: Sep. 19, 2000

(30) Foreign Application Priority Data

Sep. 20, 1999 (KR) ......................................... 1999-40463

(51) Int. Cl.$^7$ ............................................... B01J 23/00
(52) U.S. Cl. ....................................... 502/350; 502/242
(58) Field of Search .................................. 502/350, 242

(56) References Cited

U.S. PATENT DOCUMENTS 4,648,975 A * 3/1987 Barkatt et al. ............ 210/198.2
5,759,948 A * 6/1998 Takaoka et al. ............. 502/325
5,897,958 A * 4/1999 Yamada et al. ............. 446/474
5,919,726 A * 7/1999 Hatano et al. .............. 423/338
5,981,426 A * 11/1999 Langford et al. ........... 502/305

* cited by examiner

Primary Examiner—Stanley S. Silverman
Assistant Examiner—Edward M. Johnson
(74) Attorney, Agent, or Firm—Fleshner & Kim, LLP

(57) ABSTRACT

There is provided a method for preparing an anatase type titanium dioxide photocatalyst having a particle size of nano level without a need of the sintering process at high temperature, and an anatase type titanium dioxide photocatalyst having a particle size nano level. The method for preparing an anatase type titanium dioxide photocatalyst having a particle size of nano level includes adding a titanium-based starting material to a selected solvent and adding an acid or base catalyst to the resulting aqueous solution. Next, subjecting the catalyst-containing aqueous solution to heat treatment at about 80±20° C. to activate peptization thereby preparing an anatase type titanium dioxide sol solution. Finally, the anatase type titanium dioxide sol solution is coated onto a support to complete the preparation of the photocatalyst.

7 Claims, 2 Drawing Sheets

METHOD FOR MAKING ANATASE TYPE TITANIUM DIOXIDE PHOTOCATALYST

BACKGROUND OF THE INVENTION

1. Field of the Invention

The present invention relates to a method for preparing an anatase type titanium dioxide photocatalyst having a particle size of nano level and the photocatalyst prepared by the method and, more particularly, to a method for preparing a photocatalyst without a need of sintering process and a photocatalyst prepared by the said method.

2. Description of the Related Art

Studies on the photocatalysts, starting from the fields related to the conversion and storage of solar energy, have been vigorously made in connection with degradation of various organic compounds under UV radiation in the presence of a photocatalyst with a view to water purification wastewater treatment, deodorization in a refrigerator or vehicle, and so forth.

Those studies were initiated in 1839 when Becquerel generated voltage and current with a silver chloride electrode immersed in an electrolyte and connected with a pair electrode, and had a rapid progress since 1972 when Fujishima and Honda in Japan reported that a radiation on a $TiO_2$ single crystal electrode decomposed water into hydrogen and oxygen.

Titanium dioxide is the most stable and popular photocatalyst of easiness in preparation that has ever been tested. In order to be used as a photocatalyst, titanium dioxide has to exhibit crystallinity as an anatase type. Thus, in a case where amorphous titanium dioxide is formed from a titanium-based starting material through hydrolysis and condensation polymerization, there is a necessity to carry out a heat treatment at high temperature, i.e., sintering process, in order to convert the amorphous titanium dioxide to an anatase type titanium dioxide. It is known that the sintering temperature is typically around 400° C.

Among conventional methods using titanium dioxide as a photocatalyst, there can be distinguished as the most widely used methods: a first method of using an anatase type titanium dioxide in the powder form and a second one of using a thin film of the anatase type titanium dioxide formed on a specific support by a sol-gel method. Although the former is superior to the latter in the photocatalyst activity due to the relatively large surface area of the titanium dioxide prepared, the latter is more practicable in the aspect of stability of the titanium dioxide. Therefore, the actually used photocatalysts are prepared by the second method that involves formation of a titanium dioxide film on a support by means of a sol-gel method.

Now, a description will be given below to the conventional sol-gel method for preparing a photocatalyst in connection with FIG. 1.

Figure 1:
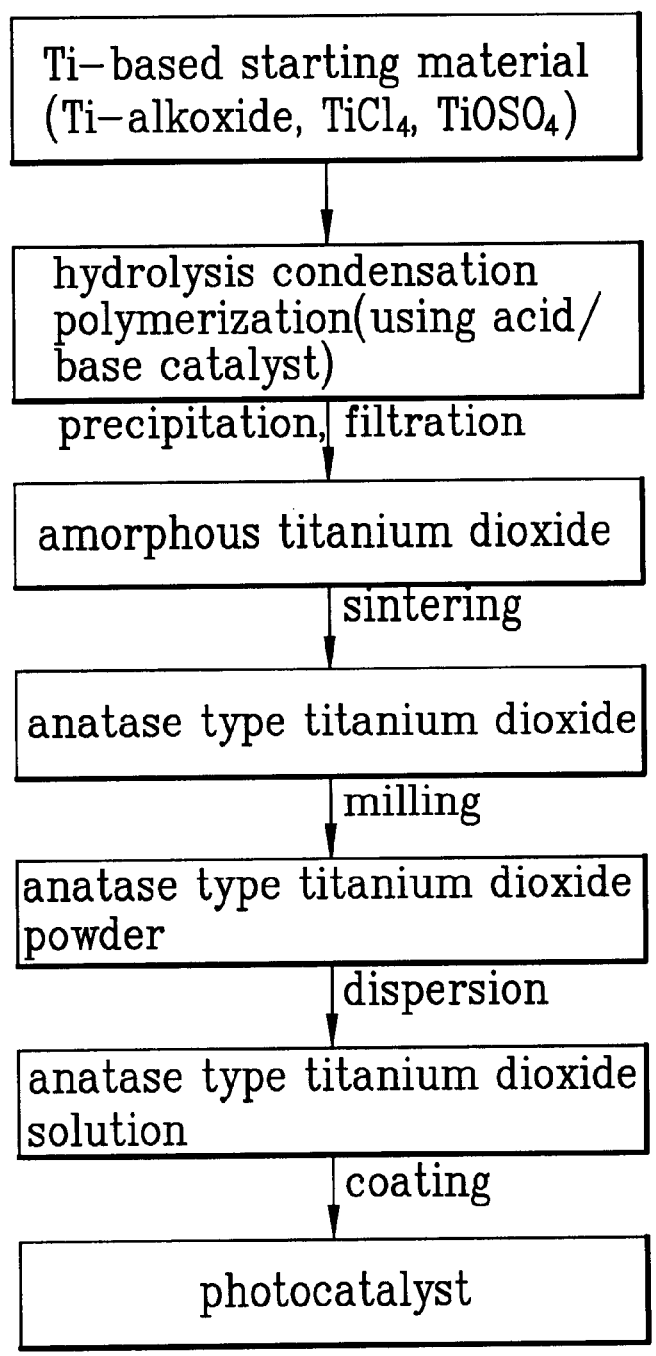

FIG. 1 is a flow chart showing a process for preparing a titanium dioxide photocatalyst by the conventional sol-gel method.

The process includes the steps of: (a) preparing a $TiO_2$ precipitate from an aqueous solution of a titanium-based starting material such as titanium alkoxide, $TiCl_4$, $TiOSO_4$, etc. by hydrolysis and condensation polymerization; (b) subjecting the precipitate to filtration to obtain a while amorphous titanium dioxide; (c) sintering the amorphous titanium dioxide at high temperature to obtain an anatase type titanium dioxide; (d) milling the resulting titanium dioxide to yield a powdery titanium dioxide; (e) dispersing the powder in a specific solvent to prepare an anatase type titanium dioxide solution; and (f) coating the solution on a support.

Such a conventional method for preparing a titanium dioxide photocatalyst is a multistage process that involves the steps of filtration, sintering, milling and dispersion, which may cause an increase in the unit production cost. The conventional method is also a troublesome in that there is a need of milling the anatase type titanium dioxide into very tiny particles, i.e., in the particle size of nano level, and dispersing the particles in a specific solvent prior to a coating step, in order to enhance the outer appearance of the finally coated photocatalyst or to increase the surface area of the photocatalyst to be in contact with the outside. With a large particle size of the anatase type titanium dioxide, an excessively large amount of the precipitate may be formed in the dispersion step and the resulting photocatalyst is inapplicable to a coating solution.

Also, the use of several additives for enhancing the coating characteristic and the hardness of the photocatalyst films may cause a problem to deteriorate the stability of the titanium dioxide disperse solution and result in formation of precipitates.

The most well-known anatase type titanium dioxide powder commercially available is P25 supplied by Degussa, which is now manufactured in a limited number of countries. There are also commercially available coating products containing a photocatalyst dispersed in water and ethanol, which are too expensive due to their complicate preparation process.

SUMMARY OF THE INVENTION

Accordingly, an object of the present invention, contrived to solve the above-stated problems with the prior art, is to provide a method for preparing an anatase type titanium dioxide photocatalyst having a particle size of nano level without a need of the sintering process at high temperature, and an anatase type titanium dioxide photocatalyst having a particle size of nano level prepared by the said method.

To achieve the object of the present invention, there is provided a method for preparing an anatase type titanium dioxide photocatalyst having a particle size of nano level including the steps of: adding a titanium-based starting material to a selected solvent; adding an acid or base catalyst to the resulting aqueous solution; subjecting the catalyst-containing aqueous solution to heat treatment at about 80±20° C. to activate peptization and thereby prepare an anatase type titanium dioxide sol solution; and coating the anatase type titanium dioxide sol solution on a support.

BRIEF DESCRIPTION OF THE ATTACHED DRAWINGS

Figure 2:
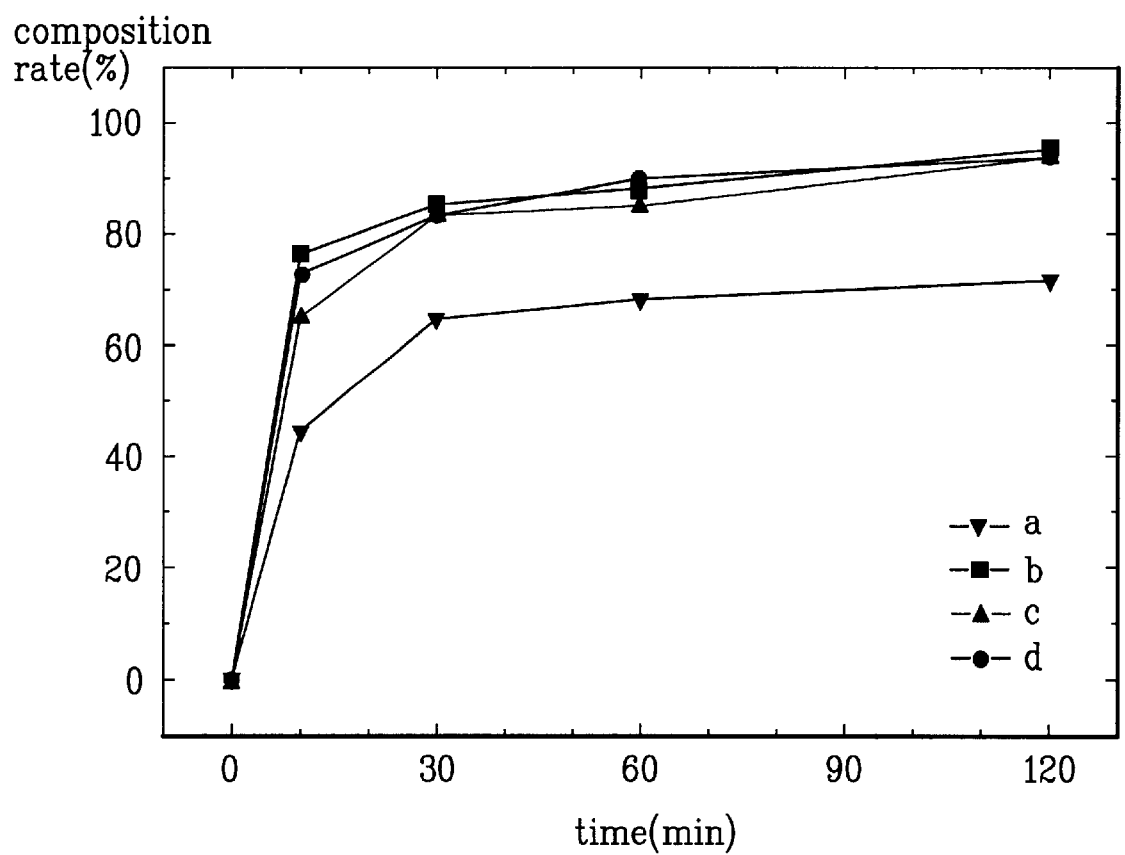

The accompanying drawings, which are included to provide a further understanding of the invention and are incorporated in and constitute a part of this specification, illustrate embodiments of the invention and together with the description serve to explain the principles of the drawings:

In the drawings:

FIG. 1 is a flowchart showing a process of preparing an anatase type titanium dioxide photocatalyst according to related art; and FIG. 2 shows comparative graphs plotting the results of experiments in regard to decomposition of methylene blue by a conventional $TiO_2$ photocatalyst (in graph "a"); an anatase type $TiO_2$ photocatalyst of the present invention (in graph "b"); a $TiO_2$—$SiO_2$(50:50 in mol% ratio) photocatalyst of the present invention (in graph "c"); and a $TiO_2$—$SiO_2$(67:33 in mol% ratio) photocatalyst of the present invention (in graph "d").

DETAILED DESCRIPTION OF PREFERRED EMBODIMENT

Hereinafter, a detailed description will be given in connection with the accompanying drawings as to a novel method for preparing an anatase type titanium dioxide photocatalyst having a particle size of nano level and the photocatalyst prepared by the said method.

The method of the present invention to prepare an anatase type titanium dioxide photocatalyst having a particle size of nano level comprises the steps of: adding a titanium-based starting material to a selected solvent; adding an acid or base catalyst to the resulting aqueous solution; subjecting the catalyst-containing aqueous solution to heat treatment at about 80 20 to activate peptization and thereby prepare an anatase type titanium dioxide sol solution; and coating the anatase type titanium dioxide sol solution on a support.

The solvent is brought under continuous stirring during the step of adding the titanium-based starting material to the solvent and/or the step of subjecting the catalyst-containing aqueous solution to heat treatment and peptization.

The selected solvent as used herein may comprise distilled water, alcohol, or a mixture thereof.

The titanium-based starting material as used herein may be titanium alkoxide, titanium chloride, or titanium sulfate. Examples of the titanium-based starting material include titanium (IV) isopropoxide, titanium (IV) ethoxide, $TiCl_4$ and $TiOSO_4$.

In the preparation method, the duration of the peptization may be increased with a larger amount of the titanium-based starting material. This is because there is required a relatively long time for peptization with a large amount of the titanium-based starting material used, although the duration of the peptization has no particular relationship to the crystallinity of the anatase type titanium dioxide. The additional reaction time is typically about 2 to 10 hours.

The peptization temperature is about 80±20° C., which has a significant effect on the particle size and the crystallinity of titanium dioxide, and further on the stability of the anatase type titanium dioxide sol solution. Therefore, an inadequate peptization temperature may raise a problem in coating the titanium dioxide sol solution on the support. That is, a rise of the reaction temperature above 100° C. in the peptization step accelerates the peptization and increases the particle size of the titanium dioxide, thereby greatly affecting the stability of the anatase type titanium dioxide sol solution. Contrarily; with the reaction temperature lowered below 60° C., the crystallinity of titanium dioxide is sharply decreased, resulting in formation of an amorphous titanium dioxide sol solution.

In summary, according to the preparation method of the present invention, to an adequate amount of a selected solvent are slowly added a titanium-based starting material and then an adequate amount of an acid or base catalyst for promoting the reaction rate, after which the resulting mixture is subjected to a heat treatment at about 80±20° C. for an adequate reaction time, e.g., about 2 to 10 hours so as to activate the peptization of titanium dioxide. The amorphous titanium dioxide having a size of nano level thus prepared is then converted to an anatase type titanium dioxide by the peripheral heat energies.

The support to be coated with the anatase type titanium dioxide sol solution may be made of a glass, aluminum, steel, ceramic or other polymer sheets. The additives as used herein may be an inorganic binder (e.g., $SiO_2$ and $Al_2O_3$), an organic binder (e.g., acetic acid and fatty acids), or an organic-inorganic hybrid binder. The individual additives are added in different steps depending on their type.

For example, silicon oxide, clay, or silicon alkoxide used as an additive may be previously mixed with the solvent prior in addition to the titanium-based starting material. Furthermore, the silicon alkoxide is added to the sol solution at a temperature lowered to the room temperature after the peptization step and stood for more several hours.

Different from the conventional method in which a $TiO_2$ powder must be formed prior to preparation of a $TiO_2$ nano-sol solution, the novel method for preparing a titanium dioxide photocatalyst as described above makes it possible to immediately prepare a $TiO_2$ nano-sol solution containing particles of a desired size by adequately regulating the composition (i.e., mole ratio) of the reactant materials. Here, the pH value and the composition of the reactant materials, especially, Ti-based starting material and solvent have a close relationship to the dispersability and stability of the resulting photocatalyst in association with the stability of the sol solution, the particle size and the surface properties of the particles. During the reaction, an adequate control of the reaction temperature allows to secure crystallinity of the anatase type titanium dioxide in the solution.

In the novel preparation method, the type of the additives affects the stability and properties of the sol solution. It is thus necessary to properly determine the type and concentration of the additives in order to attain a desired property of the sol solution. For example, the size and surface characteristics of titanium dioxide colloidal particles can be controlled by regulating (1) the type and concentration of various additives, including an inorganic binder (e.g., $SiO_2$ and $Al_2O_3$), an organic binder (e.g., acetic acid and fatty acids), or an organic-inorganic hybrid binder, and (2) the peptization conditions such as duration and temperature.

The present invention also provides an anatase type titanium dioxide photocatalyst having a size of nano level as prepared by the above-stated preparation method.

Hereinafter, the present invention will now be described in further detail by way of preferred embodiments of a photocatalyst preparing method. It is to be noted that the following descriptions of the preferred embodiments of the invention are presented herein for the purpose of illustration and description only and not intended to limit the scope of the invention which is defined by the claims.

EXAMPLE 1

Preparation of Anatase Type $TiO_2$ Nano Sol

There were used 97% titanium (IV) isopropoxide, 70% nitric acid, and 2-propanol, as supplied by Aldrich, and a highly pure distilled water (18MΩ). The titanium dioxide thus obtained was analyzed in terms of crystallinity as measured by the X ray differentiator (XRD; Rigaku D/MAX-IIIC), particle size by the transmission electron microscope (TEM; Philips CM 20T/STEM), and after-coating surface property by the scanning electron microscope (SEM; Joel JSM-820).

The distilled water (180 ml) was added to a three-neck round bottom flask, followed by slowly adding a mixed solution of the 2-propanol (5 ml) and the titanium (IV) isopropoxide (30 ml) through a dropping funnel under stirring with a mechanical stirrer. As the mixed solution was completely added, the nitric acid (2 ml) was added to the flask, which was then immersed in a hot oil bath at 80° C. and stirred with the mechanical stirrer for 8 hours.

The sol solution thus prepared was dip coated on a glass to form a film, after which the film was analyzed in regard to crystallinity so as to determine the crystal peaks. It was found that the particle size of the titanium dioxide in the sol solution prepared was about 5.1 nm from the TEM (see. Table 1).

A organic decomposition test was carried out on 0.25× $10^{-3}$wt. % of methylene blue in order to measure the photocatalystic activity of the sol solution prepared. As a result, it was observed that about 94% of the methylene blue was decomposed in about 2 hours under UV radiations with a wavelength of about 250 nm and an intensity of 1 mW. The results are plotted in graph (a) of FIG. 2.

EXAMPLE 2

Preparation of Anatase Type $TiO_2$—$SiO_2$ (50:50 in mol% ratio) Nano Sol

There were used, without purification, 70% titanium (IV) ethoxide, 70% nitric acid, 98% tetraethyl orthosilicate and 99% ethanol, as supplied by Aldrich, and a highly pure distilled water (18 MΩ). The titan dioxide thus obtained was analyzed in terms of crystallinity as measured by the XRD (Rigaku D/MAX-IIIC), particle size by the TEM (Philips CM20T/STEM), and after-coating surface property by the SEM (Joel JSM-820).

The distilled water (45 ml) was added to a three-neck round bottom flask, followed by slowly adding a mixed solution of the ethanol (1 ml) and the titanium (IV) ethoxide (7.5 ml) through a dropping funnel under stirring with a mechanical stirrer. As the mixed solution was completely added, the nitric acid (1 ml) was added to the flask, which was then immersed in a hot oil bath at 80° C. and stirred with the mechanical stirrer for 4 hours. Upon cooling down the flask to the room temperature while stirring, there was gradually added a mixed solution of tetraethyl orthosilicate (5.5 ml), distilled water (0.9 ml), nitric acid (0.019 ml) and ethanol (13 ml) through a dropping funnel, after which the flask was stirred at the room temperature for more about 2 hours.

The sol solution thus prepared was dip coated on a glass and the resulting film was analyzed in regard to crystallinity so as to determine the crystal peaks of the anatase type titanium dioxide. It was found that the particle size of the titanium dioxide in the sol solution prepared was about 15 nm from the TEM (see. Table 1).

A organic decomposition test was carried out on 0.25× $10^{-3}$wt. % of methylene blue in order to measure the photocatalystic activity of the sol solution prepared. As a result, it was observed that about 94% of the methylene blue was decomposed in about 2 hours under UV radiations with a wavelength of about 250 nm and an intensity of 1 mW. The results are plotted in graph (b) of FIG. 2.

EXAMPLE 3

Preparation of Anatase Type $TiO_2$—$SiO_2$ (67:33 in mol% ratio) Nano Sol

There were used, without purification, 70% titanium (IV) ethoxide, 70% nitric acid, 98% tetraethyl orthosilicate and 99% ethanol, as supplied by Aldrich, and a highly pure distilled water (18 MΩ). The titan dioxide thus obtained was analyzed in terms of crystallinity as measured by the XRD (Rigaku D/MAX-IIIC), particle size by the TEM (Philips CM 20T/STEM), and after-coating surface property by the SEM (Joel JSM-820).

The distilled water (90 ml) was added to a three-neck round bottom flask, followed by slowly adding a mixed solution of the ethanol (1 ml) and the titanium (IV) ethoxide (5.24 ml) through a dropping funnel under stirring with a mechanical stirrer. As the mixed solution was completely added, the nitric acid (1 ml) was added to the flask, which was then immersed in a hot oil bath at 80° C. and stirred with the mechanical stirrer for 4 hours. Upon cooling down the flask to the room temperature while stirring, there was gradually added a mixed solution of tetraethyl orthosilicate (5.6 ml), distilled water (0.9 ml), nitric acid (0.019 ml) and ethanol (13 ml) through a dropping funnel, after which the flask was stirred at the room temperature for more about 4 hours.

The sol solution thus prepared was dip coated on a glass and the resulting film was analyzed in regard to crystallinity so as to determine the crystal peaks of the anatase type titanium dioxide. It was found that the particle size of the titanium dioxide in the sol solution prepared was about 12.2 nm from the TEM (see. Table 1).

A organic decomposition test was carried out on 0.25× $10^{-3}$wt. % of methylene blue in order to measure the photocatalystic activity of the sol solution prepared. As a result, it was observed that about 93% of the methylene blue was decomposed in about 2 hours under UV radiations with a wavelength of about 250 nm and an intensity of 1 mW. The results are plotted in graph (c) of FIG. 2.

EXAMPLE 4

Preparation of Anatase Type $TiO_2$-Clay Nano Sol

There were used, without purification, 97% titanium (IV) isopropoxide, 70% nitric acid and 99.5% propanol, as supplied by Aldrich, a clay under the trademark "montmorillonite-kunipia F" supplied by Kunimine, and a highly pure distilled water (18 MΩ). The titan dioxide thus obtained was analyzed in terms of crystallinity as measured by the XRD (Rigaku D/MAX-IIIC), particle size by the TEM (Philips CM 20T/STEM), and after-coating surface property by the SEM (Joel JSM-820).

0.1 mol% of the clay was dispersed in the distilled water and the resulting disperse solution (180 ml) was added to a three-neck round bottom flask, followed by slowly adding a mixed solution of the 2-propanol (5 ml) and the titanium (IV) isopropoxide (30 ml) through a dropping funnel under stirring with a mechanical stirrer. As the mixed solution was completely added, the nitric acid (2 ml) was added to the flask, which was then immersed in a hot oil bath at 80° C. and stirred with the mechanical stirrer for 8 hours.

The sol solution thus prepared was dip coated on a glass and the resulting film was analyzed in regard to crystallinity so as to determine the crystal peaks of the anatase type titanium dioxide. It was found that the particle size of the titanium dioxide in the sol solution prepared was about 20 nm from the TEM (see. Table 1).

A organic decomposition test was carried out on 0.25× $10^{-3}$wt. % of methylene blue in order to measure the photocatalystic activity of the sol solution prepared. The results are plotted in graph (d) of FIG. 2.

TABLE 1

Comparison of Particle Size of $TiO_2$

| Div. | $TiO_2$ (100 mol %) | $TiO_2$ + $TiO_2$ (50:50 in mol % ratio) | $TiO_2$ + $TiO_2$ (67:33 in mol % ratio) | $TiO_2$ + Clay |
|---|---|---|---|---|
| Particle Size | 5.1 nm | 15 nm | 12.2 nm | 20 nm |

The novel preparation method has the following advantages.

(1) The method eliminates a need of the sintering and milling steps. That is, the anatase type titanium dioxide having a size of nano level can be prepared by a single integrated step of filtration, sintering, milling and dispersion according to the present invention. Thus there is no necessary to perform a sintering for crystallization or a milling of the resulting titanium dioxide agglomerate after the sintering.

(2) The method also eliminates a need of the dispersion step for preparing a coating solution. In this method, the anatase type titanium dioxide aqueous solution with a particle size of nano level is maintained in a stable state for a long time and thus can be used immediately as a coating solution without any treatment. This makes it possible to skip a step of dispersing the milled titanium dioxide particles in the solvent to prepare a separate coating solution.

(3) In preparation of a titanium dioxide photocatalyst having different properties due to various additives, the invention allows a simple process for the preparation while reducing a possibility of various problems arisen in association with the additives dispersed in the solvent, such as chemical reaction, precipitation and phase separation.

(4) The photocatalyst obtained in this preparation method is available as a coating applied on different supports in a simple way. According to the preparation method of the present invention, the anatase type titanium dioxide solution having a particle size of nano level exhibits an optical activity and thus can be coated on the supports without any separate treatment. This coating on the support forms the final photocatalyst only after a drying.

As described above, the preparation method of the present invention makes it possible to provide an anatase type titanium dioxide having a controllable particle size of nano level in a single step, the anatase type titanium dioxide being-easily coated on a support. Namely, the present invention method eliminates a need of filtration, sintering, milling and dispersion in the preparation of a titanium dioxide photocatalyst to make the preparation process simple with reduced production cost, as well as making it easier to introduce various additives in the photocatalyst, thereby providing a photocatalyst film with high strength applicable to almost supports.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for preparing an anatase type titanium dioxide photocatalyst having a particle size of nano level, comprising:

adding a titanium-based starting material to a selected solvent to form a resulting solution;

adding an acid or base catalyst to the resulting solution to form a catalyst-containing solution;

subjecting the catalyst-containing solution to heat treatment at about 80±20° C. to activate peptization and thereby prepare an anatase type titanium dioxide sol solution; and coating the anatase type titanium dioxide sol solution onto a support, wherein the anatase type titanium dioxide photocatalyst having a size of nano level is prepared to further comprise additives, wherein the additives are added in different steps depending on the type of additive, wherein the additives are any one selected from the group consisting of an inorganic binder, an organic binder, and an organic-inorganic hybrid binder, and wherein the additives are any one selected from the group consisting of silicon oxide, clay, and silicon alkoxide, wherein the silicon oxide and the clay are mixed with the selected solvent prior to addition of the titanium-based starting material, wherein the silicon alkoxide is added to the sol solution at a temperature lowered to room temperature after peptization.

2. The method as claimed in claim 1, wherein the selected solvent is under stirring during the adding of the titanium-based starting material.

3. The method as claimed in claim 1, wherein the selected solvent is a solution comprising distilled water, alcohol, or a mixture thereof.

4. The method as claimed in claim 1, wherein the titanium-based starting material is any one selected from the group consisting of titanium alkoxide, titanium chloride, and titanium sulfate.

5. The method as claimed in claim 1, wherein the solvent is under stirring during the subjecting of the catalyst-containing solution to heat treatment and peptization.

6. The method as claimed in claim 1, wherein the duration of the peptization increases with an increase in a starting amount of the titanium-based starting material.

7. The method as claimed in claim 1, wherein the support is any one selected from the group consisting of glass, aluminum, steel, ceramic and other polymer sheets.

* * * * *